United States Patent
Chang et al.

(10) Patent No.: US 11,988,606 B2
(45) Date of Patent: May 21, 2024

(54) METHOD AND APPARATUS FOR MULTIPLEXED IMAGING OF BIOMOLECULE THROUGH ITERATIVE UNMIXING OF FLUOROPHORE SIGNALS

(71) Applicant: Korea Advanced Institute Of Science And Technology, Daejeon (KR)

(72) Inventors: Jae-Byum Chang, Daejeon (KR); Young-Gyu Yoon, Daejeon (KR); Junyoung Seo, Daejeon (KR); Yeonbo Sim, Daejeon (KR); Jee Won Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 390 days.

(21) Appl. No.: 17/445,629

(22) Filed: Aug. 23, 2021

(65) Prior Publication Data
US 2022/0065788 A1   Mar. 3, 2022

(30) Foreign Application Priority Data

Aug. 25, 2020  (KR) .................. 10-2020-0106838
Aug. 28, 2020  (KR) .................. 10-2020-0109519

(Continued)

(51) Int. Cl.
*G01N 21/64* (2006.01)
*G06T 7/00* (2017.01)
*G02B 21/00* (2006.01)

(52) U.S. Cl.
CPC ..... *G01N 21/6458* (2013.01); *G01N 21/6486* (2013.01); *G06T 7/0014* (2013.01);
(Continued)

(58) Field of Classification Search
CPC .......... G01N 21/6458; G01N 21/6486; G01N 2021/6419; G01N 2021/6421; G06T 7/0014; G06T 2207/10064; G02B 21/0076
(Continued)

(56) References Cited

U.S. PATENT DOCUMENTS 9,717,417 B2   8/2017  DiMaio
10,048,208 B2  8/2018  Rothberg
(Continued)

FOREIGN PATENT DOCUMENTS

JP   2015-108549   6/2015
JP   2019-502418   1/2019
(Continued)

OTHER PUBLICATIONS

Mansfield, J. R. et al., "Beyond autofluorescence removal: automated analysis methods for multispectral in-vivo imaging," Proc. Opt. Soc. Amer., 2005 (4 pages).
(Continued)

*Primary Examiner* — Michael R Neff
(74) *Attorney, Agent, or Firm* — NIXON PEABODY LLP

(57) ABSTRACT

The present disclosure provides a method and apparatus for biomolecular multiplexed imaging through the iterative unmixing of fluorophores. According to the first embodiments of the present disclosure, although signals of two fluorophores are detected in the first fluorescent detection spectral range, the signals of the two images obtained from two detection spectral ranges can be unmixed through the iterative minimization of mutual information. Furthermore, the present disclosure provides a multi-color unmixing method and apparatus through the iterative minimization of mutual information. In the second embodiments of the present disclosure, a plurality of images of a plurality of
(Continued)

fluorophores marking different biomolecules, respectively, for example, N fluorophores are obtained. Images, each containing the signals of single fluorophore can be obtained from the obtained images while minimizing the mutual information shared by images of each of pairs each consisting of two of the obtained images.

11 Claims, 16 Drawing Sheets

(30) Foreign Application Priority Data

Jul. 8, 2021 (KR) .......................... 10-2021-0089419
Jul. 9, 2021 (KR) .......................... 10-2021-0090057

(52) U.S. Cl.
CPC ................ *G01N 2021/6419* (2013.01); *G01N 2021/6421* (2013.01); *G02B 21/0076* (2013.01); *G06T 2207/10064* (2013.01)

(58) Field of Classification Search
USPC ....................................................... 382/128
See application file for complete search history.

(56) References Cited

U.S. PATENT DOCUMENTS

| | | | |
|---|---|---|---|
| 11,703,454 B2* | 7/2023 | Chang | .................. G06T 7/0012 |
| | | | 250/459.1 |
| 2004/0161165 A1 | 8/2004 | Riley | |
| 2011/0249911 A1 | 10/2011 | Determan | |
| 2017/0053397 A1 | 2/2017 | Chukka | |
| 2019/0220981 A1 | 7/2019 | Chen | |
| 2019/0339203 A1 | 11/2019 | Miller et al. | |
| 2020/0080940 A1 | 3/2020 | Garsha | |
| 2021/0089749 A1* | 3/2021 | Amthor | .................. G06F 18/24 |
| 2022/0215517 A1* | 7/2022 | Chang | ....................... G06T 7/90 |

FOREIGN PATENT DOCUMENTS

| | | |
|---|---|---|
| JP | 2020-020791 A | 2/2020 |
| KR | 10-2016-0108316 | 9/2016 |
| WO | WO 2019/138028 A1 | 7/2019 |

OTHER PUBLICATIONS

Levenson, R. M. et al., "Multiplexing with Multispectral Imaging: From Mice to Microscopy," ILAR Journal 49(1): 78-88, Jan. 1, 2008.
Extended European Search Report in European Patent Application No. EP 21192162, dated Jan. 14, 2022 (14 pages).

* cited by examiner

METHOD AND APPARATUS FOR MULTIPLEXED IMAGING OF BIOMOLECULE THROUGH ITERATIVE UNMIXING OF FLUOROPHORE SIGNALS

CROSS-REFERENCES TO RELATED APPLICATIONS

This application is based on and claims priority under 35 U.S.C. 119 to Korean Patent Application Nos. 10-2020-0106838 filed on Aug. 25, 2020, 10-2020-0109519 filed on Aug. 28, 2020, 10-2021-0089419 filed on Jul. 8, 2021, and 10-2021-0090057 filed on Jul. 9, 2021 in the Korean intellectual property office, the disclosures of which are herein incorporated by reference in their entireties.

TECHNICAL FIELD

The present disclosure relates to a method and apparatus for biomolecular multiplexed imaging through the iterative unmixing of the images of fluorophores. Furthermore, the present disclosure relates to a multiplexed unmixing method and apparatus through the iterative minimization of mutual information.

BACKGROUND OF THE INVENTION

Cancer immunotherapy that produces an anti-cancer effect by activating immunocytes within a cancer tissue of a patient has recently been greatly in the great spotlight. Cancer immunotherapy has a great deviation in its anti-cancer effect depending on which immunocytes exist within a cancer tissue of a patent. In order to select an optimum anti-cancer drug or develop cancer immunotherapy for each patient, it is necessary to simultaneously image several immune markers within a cancer tissue of a patient. The existing several multiplexed imaging technologies are not widely used in the development of cancer immunotherapy, the discovery of a new biomarker, and the prediction of cancer immunotherapy reactivity due to several disadvantages, such as that expensive special equipments are required, the process is complicated, an imaging speed is slow, or a sample is destroyed during the imaging process. Accordingly, to recommend optimum cancer immunotherapy and to develop new cancer immunotherapy for each patient, there is a need for a low-cost, high-efficiency multiplexed imaging technology.

SUMMARY

This summary is provided to introduce a selection of concepts in a simplified form that is further described below in the Detailed Description. This summary is not intended to identify key features of the claimed subject matter, nor is it intended to be used as an aid in determining the scope of the claimed subject matter.

Embodiments of the present disclosure provide a method and apparatus for multiplexed imaging of biomolecules through the iterative unmixing of fluorophores.

Furthermore, embodiments of the present disclosure provide an unmixing method and apparatus through the minimization of mutual information.

In an aspect, a method of an electronic device may include obtaining at least two images of at least two fluorophores labeling different biomolecules, respectively, and unmixing the obtained images into images, each containing the signals of a single fluorophore, while iteratively minimizing mutual information shared by the obtained images.

In an aspect, an electronic device includes a memory and a processor connected to the memory and configured to execute at least one instruction stored in the memory. The processor may be configured to obtain at least two images of at least two fluorophores labeling different biomolecules, respectively, and unmix the obtained images into images, each containing the signals of a single fluorophore, while iteratively minimizing mutual information shared by the obtained images.

According to the present disclosure, image unmixing performance can be improved. In this case, in the present disclosure, a strategy for selecting specific fluorophores and fluorescent detection spectral ranges can be removed and relaxed through the iterative mutual information minimization strategy. Furthermore, in the present disclosure, signals of two fluorophores can be successfully unmixed through a estimation for each step and gradual signal unmixing with respect to two images in which the signals of the two fluorophores are detected with different intensities.

Furthermore, as a result of the present disclosure, images of two fluorophores with a 20-nm or less difference in their emission peak wavelengths can be successfully unmixed. In the present disclosure, images of two fluorophores having similar emission spectra can be successfully unmixed through the iterative mutual information minimization without an optimization process for fluorescence detection spectral ranges. In the present disclosure, a signal-to-noise ratio is increased because a range of the first fluorescent detection spectral range can be widely set due to the exclusion of a fluorescent detection spectral range selection strategy. Accordingly, unmixed images having a high signal-to-noise ratio can be obtained. Furthermore, in the present disclosure, hardware requirements are reduced and emission filters can be freely selected because a spectral range specified for each fluorophore does not need to be selected.

Furthermore, according to the present disclosure, image unmixing performance can be improved. In this case, in the present disclosure, signals of three or more spectrally overlapping fluorophores, which can be excited by the same laser, can be unmixed. Specifically, in the present disclosure, images, each containing the signals of a single fluorophore, can be obtained from the same number of images acquired in different detection spectral ranges as the number of fluorophores without measuring an emission spectrum of each of the fluorophores.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
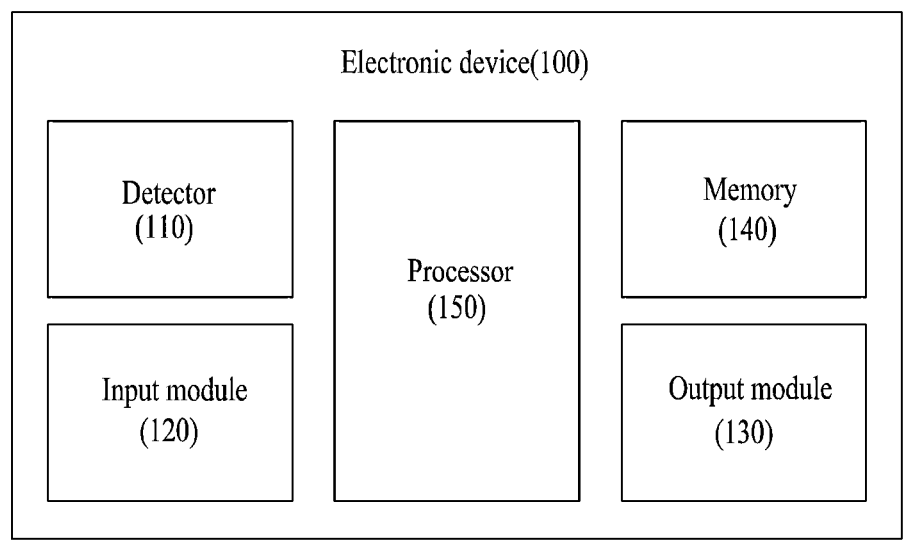
FIG. 1 is a block diagram of an electronic device according to various embodiments of the present disclosure.

While illustrative embodiments have been illustrated and described, it will be appreciated that various changes can be made therein without departing from the spirit and scope of the invention.

Embodiments of the present disclosure are described hereinafter in detail with reference to the accompanying drawings, in order for a person having ordinary knowledge in the art to which the present disclosure pertains to easily carry out the present disclosure. The present disclosure may be implemented in various different ways, and is not limited to the disclosed embodiments herein. In the drawings, in order to clearly describe the present disclosure, a description of parts unrelated to the description is omitted, and similar reference numbers are used to refer to similar parts throughout the specification.

In the entire specification, unless explicitly described to the contrary, any part "includes (or comprises)" another element will be understood to imply the further inclusion of another element, not the exclusion of any other elements. Furthermore, the term " . . . unit", . . . er (or . . . or), or "module" described in the specification means a unit for processing at least one function or operation, and the unit may be implemented by hardware or software or a combination of hardware and software.

In the following description, the subject of an operation may be omitted, but a method described in the present disclosure may be implemented in an electronic device, for example, a device including a computing device and a fluorescence microscope.

Fluorescence imaging is a tool for marking biomolecules within a sample by using various fluorophores, exciting the marked biomolecules by using light, detecting light emitted from each of the fluorophores through an optical microscope, and indirectly monitoring the biomolecules within the sample. The fluorophores have different excitation spectra and emission spectra due to their unique chemical structures. In this case, the fluorophore always emits light with a wavelength longer than that of absorbed light. In general, the excitation and emission spectra of fluorophores have a width of about 100 nm in a visible light wavelength range (400 to 700 nm). In order to simultaneously observe several biomolecules in one sample, it is necessary to mark the several biomolecules by using different fluorophores and selectively obtain an image of each of the fluorophores. To this end, fluorophores whose excitation spectra and emission spectra do not overlap needs to be used. When four or more fluorophores are simultaneously used, emission spectra overlap between fluorophores due to a wide width of the emission spectrum, and thus cannot be distinguished. Accordingly, in general, a maximum of four biomolecules can be simultaneously detected by exciting only one fluorophore by one of the four standard excitation wavelengths (405, 488, 560, or 633 nm).

Recently, in the medical diagnosis and research field, the necessity to simultaneously image more biomolecules in one sample is increased. However, the existing fluorescence microscopes have limitations in that only a maximum of four fluorophores can be simultaneously used at a time. In order to overcome such limitations, various technologies have been developed. The technologies may be divided into three types.

First, in a multi-round staining method, after biomolecules within a sample are marked and imaged using three or four fluorophores whose emission spectra do not overlap, the fluorophores are deactivated through chemical treatment or are detached from the biomolecules. Thereafter, other biomolecules are marked and imaged using three or four identical fluorophores. If such a method is repeated, several tens of biomolecules can be simultaneously monitored in one biosample. However, a long time is taken and it is inconvenient to register images obtained in the repeated process because the process of marking and deactivating fluorophores has to be repeated. Furthermore, a distribution of multiple molecules cannot be obtained in a three-dimensional way due to the registration problem. Furthermore, there is a problem in that a sample is damaged during a chemical treatment process.

Second, in a spectral imaging and signal unmixing method, multiple biomolecules are marked using multiple fluorophores whose emission spectra overlap and the multiple fluorophores are simultaneously excited. Thereafter, after an image of a sample is obtained from multiple detection spectral ranges, the obtained images are unmixed into images, each of which is an image of only one fluorophore, based on the information on the relative intensity of each fluorophore in each spectral range. If the information on the emission spectra of fluorophores that have marked biomolecules is known, an image of each fluorophore can be obtained after unmixing based on the emission spectra of the fluorophores. However, in order to accurately calibrate the emission spectra of the fluorophores, an expensive and special equipment called a spectral detector is required. Furthermore, the emission spectra of fluorophores depends on an optical characteristic of a microscope, the sensitivity of a camera for each wavelength, chemical composition of a sample, etc. Accordingly, it is very difficult to use the spectral imaging and signal unmixing for tissue imaging because it is inconvenient to separately measure the emission spectrum of each fluorophore every time, every microscope, and every sample.

Third, a blind unmixing is a method of unmixing fluorophore signals in the state in which an emission spectrum of a fluorophore is unknown. To this end, independent component analysis (ICA) or non-negative matrix factorization (NMF) has been used. However, the blind unmixing is very limitedly used due to the very low accuracy of signal unmixing because millions of elements have to be precisely analogized simultaneously. For example, in order to unmix three fluorophore signals whose emission spectra overlap, 3,145,728 (=3×1024×1024) or more elements have to be simultaneously analogized (1024×1024 image resolution). Furthermore, the existing ICA or NMF has a condition in that the number of images necessary for unmixing must be greater than the number of fluorophores. That is, expensive and special equipment called a spectral detector is necessary because nine or more images need to be obtained in order to simultaneously image eight fluorophores.

Conclusionally, it is difficult to substantially use the existing multiplexed imaging techniques for research and diagnosis due to inconvenience and complexity of an experiment process and an imaging process, inaccuracy of signal unmixing, and requirements for special equipment, so that the existing multiplexed imaging techniques are not actively used. In order to solve such problems, a new blind unmixing-based multiplexed imaging technique (Process of ultra-multiplexed Imaging of biomoleCules viA the unmixing of the Signals of Spectrally Overlapping fluorophores (PICASSO) v 1.0) was recently developed. PICASSO v1.0 is a scheme for unmixing images of two spectrally overlapping fluorophores with significantly higher accuracy compared to the existing blind unmixing techniques. This technique requires only two images acquired in two different detection spectral ranges to obtain images, each containing the signals of a single fluorophores, by employing three strategies (i.e., a fluorophore selection strategy, a fluorescent detection spectral range selection strategy, and an estimation strategy through the minimization of mutual information). The existing blind unmixing technique has given rise to mathematical complexity for signal unmixing and low accuracy because millions of elements must be analogized. In contrast, the PICASSO v1.0 simplifies elements that need to be analogized as in [Equation 1] by using the fluorophore selection strategy and the fluorescent detection spectral range selection strategy.

$$\begin{bmatrix} IMG1_1 & ... & IMG1_{1,048,576} \\ IMG2_1 & ... & IMG2_{1,048,576} \end{bmatrix} = \begin{bmatrix} 1 & 0 \\ \alpha & 1 \end{bmatrix} \times \begin{bmatrix} F1_1 & ... & F1_{1,048,576} \\ F2_1 & ... & F2_{1,048,576} \end{bmatrix}$$

$$F1 = IMG1, F2 = IMG2 - \alpha \times IMG1$$

[Equation 1]

As may be seen from [Equation 1], in the PICASSO v1.0, a relation "IMG1=F1" is established so that only a signal of the first fluorophore (=F1) is included in an image IMG1 obtained from the first detection spectral range through the fluorophore selection strategy and the fluorescent detection spectral range selection strategy. IMG2 may be represented as the sum of the two fluorophore images F1 and F2 (i.e., IMG2=F1×α+F2). F1 is equal to IMG1, that is, a measured value. Accordingly, if only α is accurately analogized, F2 can be calculated (i.e., F2=IMG2−α×IMG1). In the PICASSO v1.0, a value α is accurately analogized through mutual information minimization between IMG1 and IMG2. However, signal unmixing is perfectly performed only when the relation "IMG1=F1" is established. In order to satisfy the precondition, a fluorophore and the fluorescent detection spectral range selection strategies are essential. Accordingly, in order to perform imaging in a selected fluorescent detection spectral range, there is a restricted condition in which optical filters optimized for detection spectral ranges or a spectral detector capable of freely adjusting the detection spectral ranges are required.

Hereinafter, the present disclosure proposes PICASSO v2.0 and v3.0 improved from the PICASSO v1.0. First embodiments of the present disclosure relate to PICASSO v2.0, and propose a signal unmixing scheme through the iterative minimization of mutual information. This scheme is a scheme capable of signal unmixing without the precondition "IMG1=F1" through a strategy for iteratively performing mutual information minimization. Second embodiments of the present disclosure relate to PICASSO v3.0, and relate to a technology for unmixing signals of three or more spectrally overlapping fluorophores without measuring the emission spectrum of fluorophores. This technique requires only an equal number of images to the number of fluorophores.

FIG. 1 is a block diagram of an electronic device 100 according to various embodiments of the present disclosure.

Referring to FIG. 1, the electronic device 100 according to various embodiments of the present disclosure may include at least any one of a detector 110, an input module 120, an output module 130, a memory 140 or a processor 150. In an embodiment, at least any one of the elements of the electronic device 100 may be omitted or one or more other elements may be added to the electronic device 100.

The detector 110 may photograph an image of a sample. In this case, the detector 110 is installed at a predetermined location of the electronic device 100, and may photograph the image. For example, the detector 110 may include at least any one of a scientific complementary metal-oxide-semiconductor (sCMOS) camera, a photomultiplier tube (PMT), or equipment capable of representing the intensity of light as an image by measuring the intensity of light.

The input module 120 may receive, from the outside of the electronic device 100, instruction or data to be used in at least any one of the elements of the electronic device 100. In this case, the input module 120 may include at least any one of an input device or a reception device. For example, the input device may include at least any one of a microphone, a mouse or a keyboard. In an embodiment, the input device may include at least any one of touch circuitry configured to detect a touch or sensor circuitry configured to measure the intensity of a force generated by touch. The reception device may include at least any one of a wireless reception device or a wired reception device.

The output module 130 may provide information to the outside of the electronic device 100. In this case, the output module 130 may include at least any one of a display device or a transmission device. For example, the display device may include at least any one of a display, a hologram device, or a projector. In an embodiment, the display device may be implemented as a touch screen by being assembled with at least any one of the touch circuitry or sensor circuitry of the input module 120. The transmission device may include at least any one of a wireless transmission device or a wired transmission device.

According to an embodiment, the reception device and the transmission device may be integrated into one communication module. The communication module may support communication between the electronic device 100 and an external device (not illustrated). The communication module may include at least any one of a wireless communication module or a wired communication module. In this case, the wireless communication module may consist of any one of a wireless reception device or a wireless transmission device. Furthermore, the wireless communication module may support at least any one of a long-distance communication method or a short-distance communication method. The short-distance communication method may include at least any one of Bluetooth, WiFi direct, or infrared data association (IrDA), for example. The wireless communication module may perform communication over a network by using a long-distance communication method. The network may include at least any one of a cellular network, the Internet, or a computer network such as a local area network (LAN) or a wide area network (WAN), for example. The wired communication module may consist of at least any one of a wired reception device or a wired transmission device.

The memory 140 may store at least any one of a program or data used by at least any one of the elements of the electronic device 100. For example, the memory 140 may include at least any one of a volatile memory or a non-volatile memory.

The processor 150 may control at least any one of the elements of the electronic device 100 by executing a program of the memory 140, and may perform data processing or operation. According to the first embodiments, the processor 150 may unmix images of respective fluorophores from two images obtained with respect to two fluorophores according to PICASSO v2.0. In this case, the processor 150 may unmix the obtained images into images, each containing the signals of a single fluorophore, while iteratively minimizing mutual information shared between the obtained images. According to the second embodiments, the processor 150 may unmix obtained images into images, each containing the signals of a single fluorophore, from three or more images obtained with respect to three or more fluorophores according to PICASSO v3.0. In this case, the processor 150 may unmix the obtained images into images, each containing the signals of a single fluorophore, while minimizing mutual information shared between images of each of pairs, each consisting of two of the obtained images.

Figure 2:
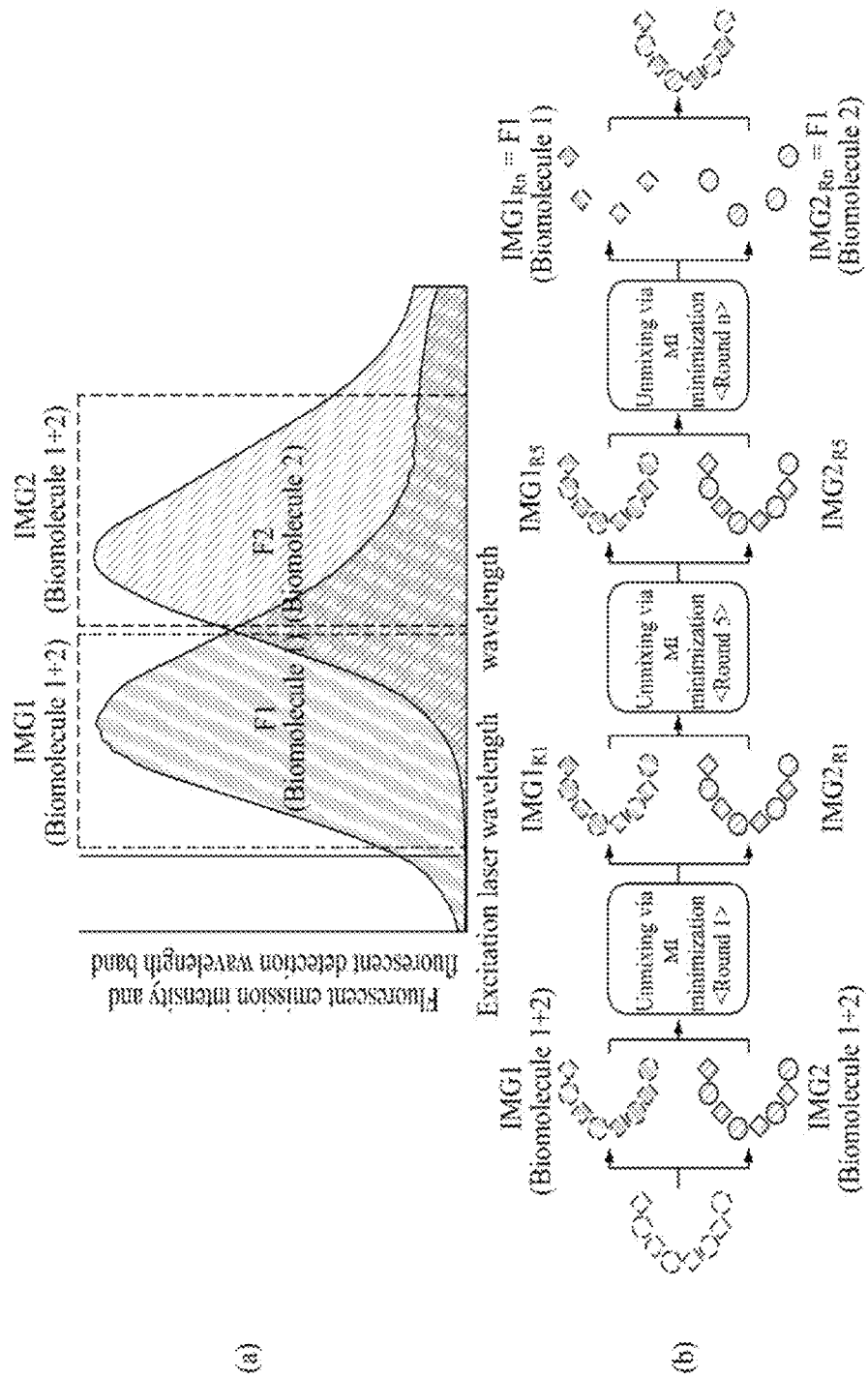
FIG. 2 is a schematic diagram for describing a signal unmixing scheme through the iterative minimization of mutual information according to the first embodiments of the present disclosure.

FIG. 2 is a schematic diagram for describing a signal unmixing scheme through the iterative minimization of mutual information according to the first embodiments of the present disclosure.

Referring to FIG. 2, the precondition "IMG1=F1" is removed through the iterative minimization of mutual information. Unlike PICASSO v1.0, although the signals of two fluorophores are detected in both first and second detection spectral ranges, IMG1 and IMG2 obtained in the two detection spectral ranges can be unmixed through the iterative minimization of mutual information. In this case, as illustrated in FIG. 2(a), the signals of the two fluorophores F1 and F2 appear to have different intensities in the two images IMG1 and IMG2 obtained in the two detection spectral ranges because emission spectra of the two fluorophores F1 and F2 are different.

A value $\alpha$ at which mutual information is minimized is calculated in the two images IMG1 and IMG2 in which the signals of the two fluorophores have different intensities. $IMG1_{R1}$ and $IMG2_{R1}$ are obtained based on the value $\alpha$. Thereafter, $IMG1_{R2}$ and $IMG2_{R2}$ may be obtained by unmixing the $IMG1_{R1}$ and $IMG2_{R1}$ through the minimization of mutual information once more. As illustrated in FIG. 2(b), the signals of the two fluorophores are gradually unmixed through the analogy of the value $\alpha$ and a process of iterating signal unmixing n times. Finally, $IMG1_{Rn}$=F1 and $IMG2_{Rn}$=F2 can be obtained by unmixing the signals of the two fluorophores.

According to the first embodiments, the processor 150 may obtain the two images IMG1 and IMG2 in the two detection spectral ranges. In this case, as illustrated in FIG. 2(a), the signals of the two fluorophores F1 and F2 appear to have different intensities in the two images obtained in the two detection spectral ranges because the emission spectra of the two fluorophores F1 and F2 are different. Furthermore, the processor 150 calculates the value $\alpha$ at which the mutual information is minimized in the two images IMG1 and IMG2 in which the signals of the two fluorophores have different intensities, and obtains $IMG1_{R1}$ and $IMG2_{R1}$ based on the value $\alpha$. Thereafter, the processor 150 calculates a value $\alpha$ at which the mutual information is minimized in the $IMG1_{R1}$ and $IMG2_{R1}$, and obtains $IMG1_{R2}$ and $IMG2_{R2}$ based on the value $\alpha$. As the processor 150 iterates such a process n times, the signals of the two fluorophores F1 and F2 are gradually unmixed, as illustrated in FIG. 2(b). Finally, the processor 150 can obtain $IMG1_{Rn}$=F1 and $IMG2_{Rn}$=F2 by unmixing the signals of the two fluorophores F1 and F2.

Figure 3:
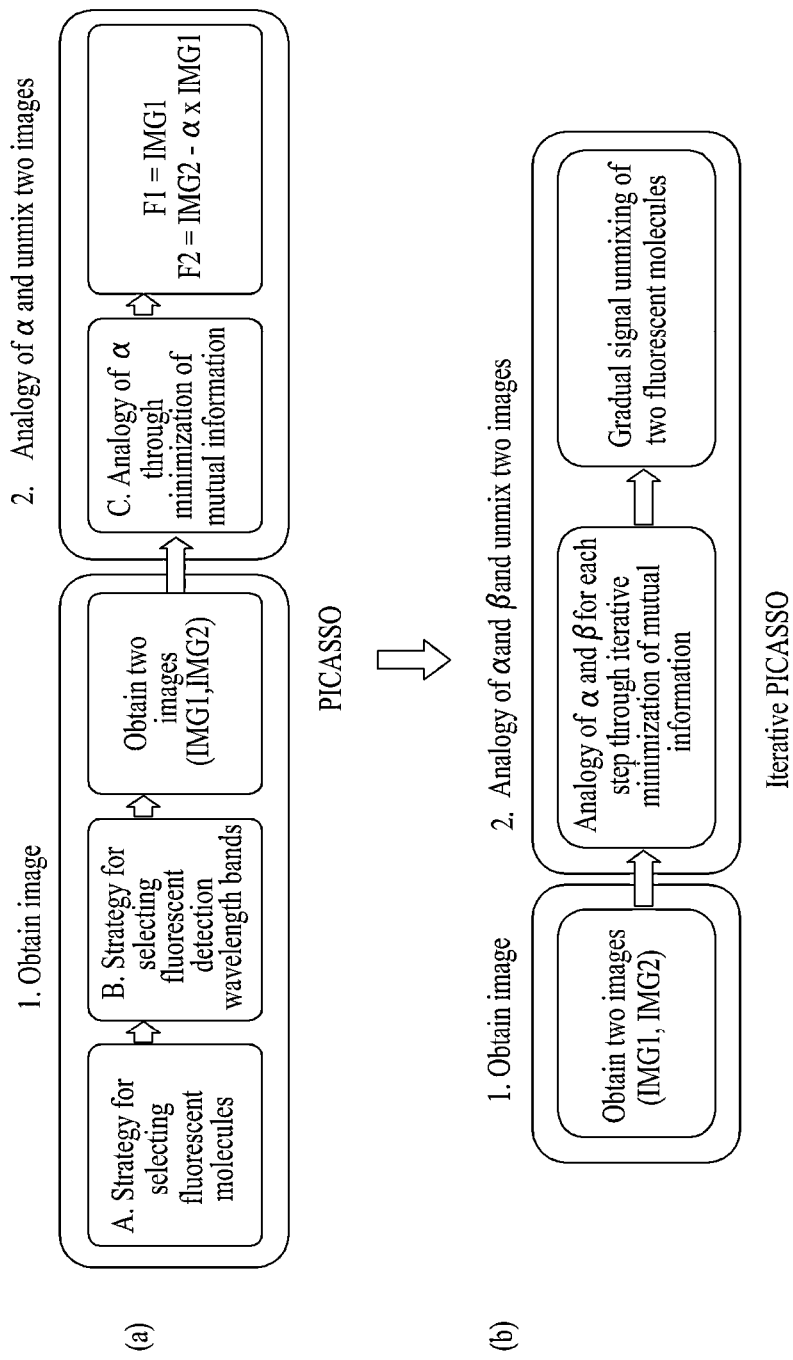
FIG. 3 is a schematic diagram for describing advantages which may be obtained according to the first embodiments of the present disclosure.

FIG. 3 is a schematic diagram for describing advantages which may be obtained according to the first embodiments of the present disclosure. In this case, FIG. 3(a) illustrates an operation procedure of the PICASSO v1.0. FIG. 3(b) illustrates an operation procedure according to the first embodiments of the present disclosure.

Referring to FIG. 3, the first embodiments of the present disclosure can obtain the following advantages compared to the PICASSO v1.0.

The first advantage is that it is not necessary to select specific detection spectral ranges.

The PICASSO v1.0 has a precondition in which the first detection spectral range must be set so that only the fluorophore F1, that is, a signal of the first fluorophore, is included (IMG1=F1). If a value $\alpha$ can be accurately analogized through the minimization of mutual information, the fluorophore F2 can be calculated (i.e., F2=IMG2−$\alpha$×IMG1) because IMG2 obtained in the second fluorescent detection spectral range may be represented as the sum of the two fluorophores F1 and F2 (i.e., IMG2=F1×$\alpha$+F2). However, there is a disadvantage in that signal unmixing is not accurately performed if the condition "IMG1=F1" is not satisfied. Furthermore, a spectral range in which the first fluorophore has a maximum emission spectrum cannot be set as the range of the first detection spectral range due to the above condition. Accordingly, the signal-to-noise ratio of the image IMG1 is reduced, so that a reduction in the quality of an image and the inaccuracy of signal unmixing are caused.

In contrast, the first embodiments of the present disclosure have an advantage in that signals can be unmixed through the iterative mutual information minimization, although the signal of the fluorophore F2 is detected in the image IMG1 (IMG1≠F1). Furthermore, a high-quality image on which signal unmixing has been more accurately performed can be obtained because the signal-to-noise ratio of the image IMG1 is increased compared to the PICASSO v1.0.

The second advantage is that the restrictive fluorophore selection strategy is relaxed. In order to set detection spectral ranges so that the condition "IMG1=F1" is established, a strategy for selecting two fluorophores having distinct emission spectra is necessary. In the PICASSO v1.0, two fluorophores having a difference of 20 nm or more between the wavelengths of their maximum emission spectra are preferred for accurate unmixing. The range of the first fluorophore detection wavelength is set narrowly due to such a fluorophore selection strategy.

For example, in the PICASSO v1.0, two fluorophores (e.g., CF488A and ATTO514) having a difference of 20 nm or more between the wavelengths of their maximum emission spectra are selected. The first fluorescent detection spectral range in which the signal of only the first fluorophore appears is set. However, if two fluorophores having a difference of 20 nm or less between the wavelengths of their maximum emission spectra are used, it is difficult to set the first fluorescent detection spectral range in which the signal of only the first fluorophore appears. Accordingly, a reduction in image quality and the inaccuracy of signal unmixing are caused because the signal-to-noise ratio of the image IMG1 is reduced. In contrast, in the first embodiments of the present disclosure, although the signal of the fluorophore F2 is detected in the image IMG1≠F1), the fluorophore selection strategy can be relaxed because signals can be unmixed through the iterative mutual information minimization. That is, signals can be accurately unmixed by using two fluorophores having a difference of 20 nm or less between the wavelengths of their maximum emission spectra. Furthermore, a high-quality image on which signal unmixing has been more accurately performed can be obtained because the signal-to-noise ratio of the IMG1 is increased compared to the PICASSO v1.0.

Figure 4:
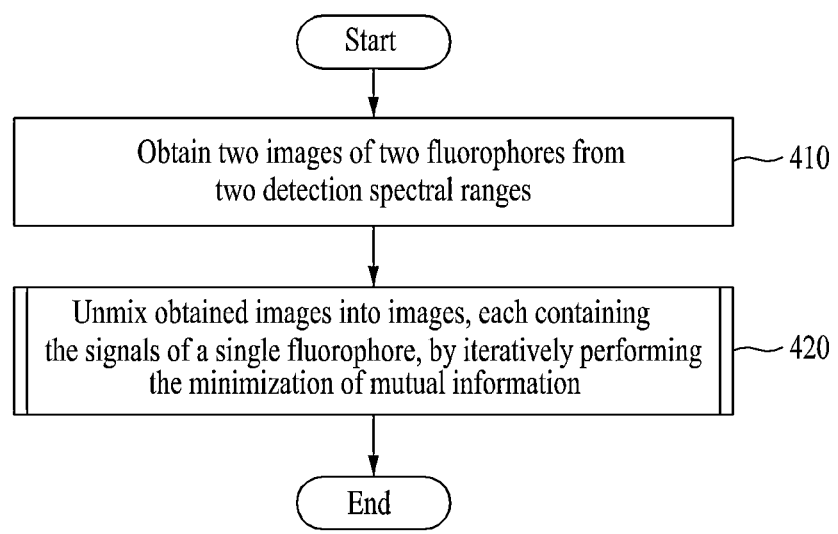
FIG. 4 is a flowchart of a signal unmixing method of the electronic device through the iterative minimization of mutual information according to the first embodiments of the present disclosure.

FIG. 4 is a flowchart of a signal unmixing method of the electronic device 100 through the iterative minimization of mutual information according to the first embodiments of the present disclosure.

Referring to FIG. 4, in step 410, the electronic device 100 may obtain two images of two fluorophores marked in different biomolecules, respectively. In this case, the processor 150 may obtain the two images in different detection spectral ranges, respectively. In this case, the two fluorophores may appear in each of the obtained two images. That is, the two fluorophores may have different fluorescent emission intensities, and may appear to have different signal intensities in the obtained images. The processor 150 may define the obtained two images as two new variables as in [Equation 2] below.

$$u1 = IMG1$$

$$u2 = IMG2 \quad \text{[Equation 2]}$$

wherein u1 and u2 may indicate the obtained images, respectively.

Next, in step 420, the electronic device 100 may unmix images of fluorophores from the two obtained images while iteratively minimizing mutual information shared between the two obtained images. To this end, the processor 150 may iteratively perform an operation of obtaining two new images updated from the two obtained images by applying a variable for minimizing the mutual information calculated with respect to the two obtained images. According to an embodiment, such an operation may be iterated by a predetermined number, that is, n times. According to another embodiment, such an operation may be iterated until the mutual information shared by the two obtained images is equal to or smaller than a reference value. When the iteration of such an operation is completed, the processor 150 can finally obtain the two obtained images as images of respective fluorophores. This will be more specifically described with reference to FIGS. 5 and 6.

In this case, mutual information is a value derived from an information theory. Mutual information between two variables may mean a total quantity of information shared by the two variables. Accordingly, mutual information between two random variables may be 0. Since a digital image is a discrete variable, mutual information shared by two images may be calculated as in [Equation 3] below.

$$I(X;Y) = \sum_y \sum_x p_{(X,Y)}(x, y) \log\left(\frac{p_{(X,Y)}(x, y)}{p_X(x)p_X(x)}\right) \quad \text{[Equation 3]}$$

wherein $p_X(x)$ and $p_Y(y)$ may correspond to probability distribution functions (or histograms) of images, respectively. $p_{(X,Y)}(x, y)$ may correspond to a coupling probability distribution function (or coupling histogram) of two images.

Figure 5:
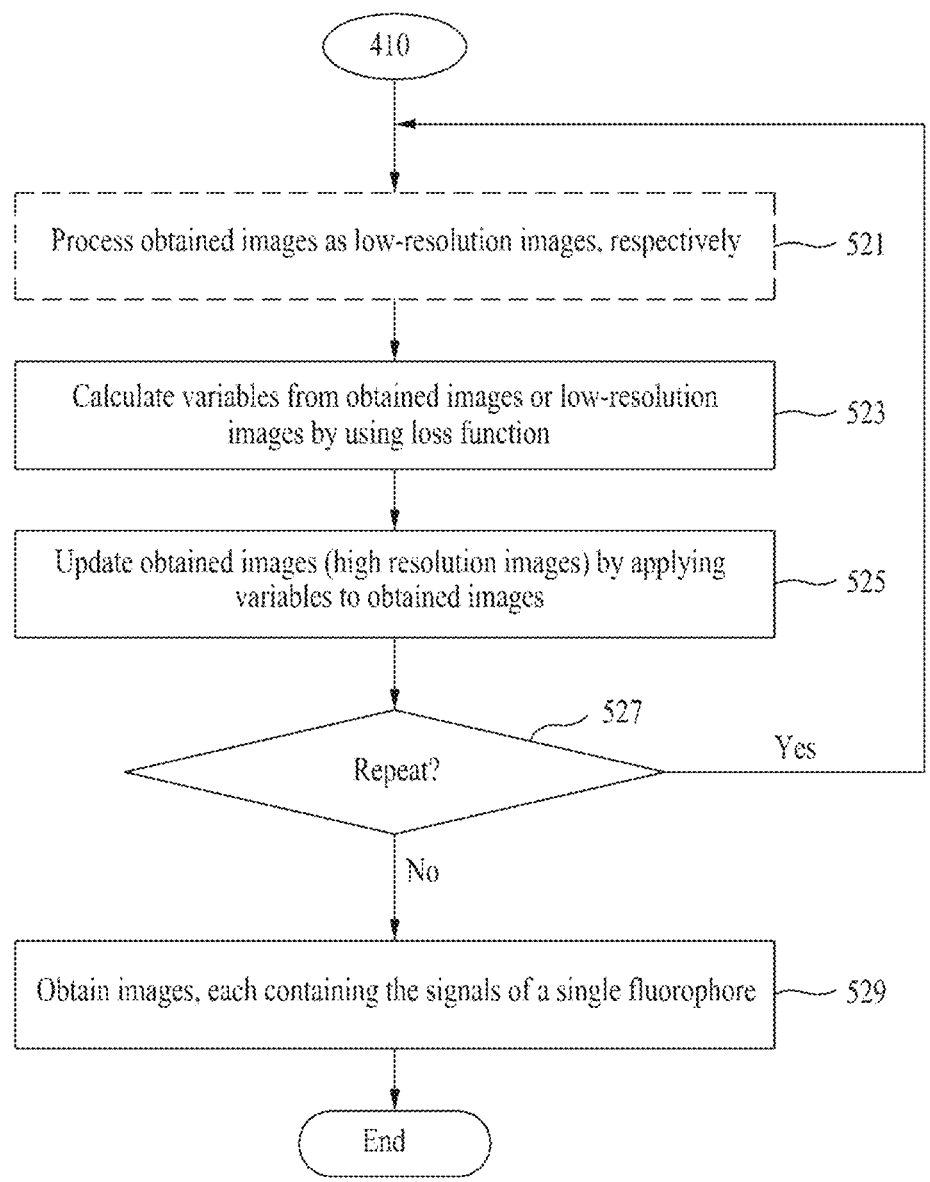
FIG. 5 is a flowchart illustrating the step of unmixing obtained images into images, each containing the signals of a single fluorophore from images obtained in the embodiment of FIG. 4.
Figure 6:
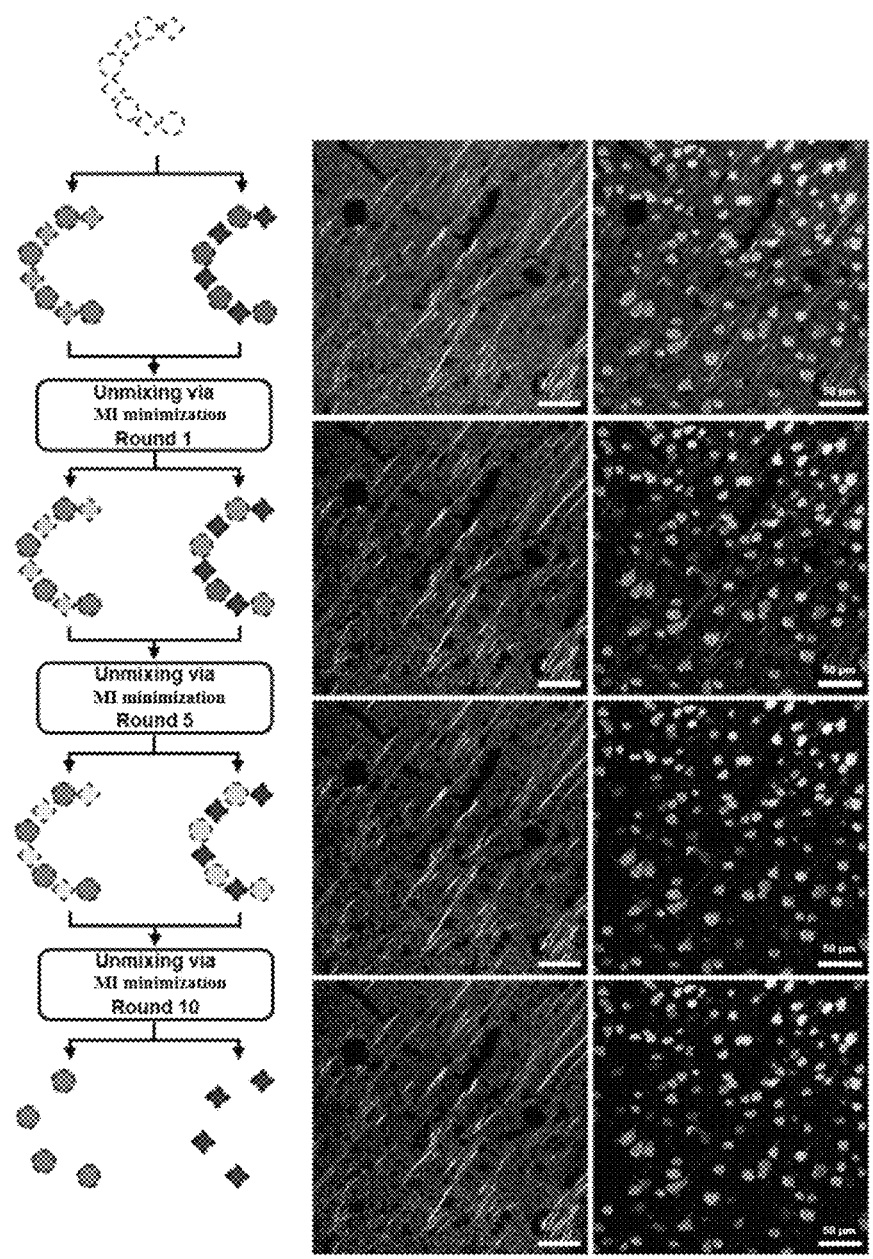
FIGS. 6 and 7 are images for describing the step of unmixing obtained images into images, each containing the signals of a single fluorophore from the images obtained in the embodiment of FIG. 4.
Figure 7:
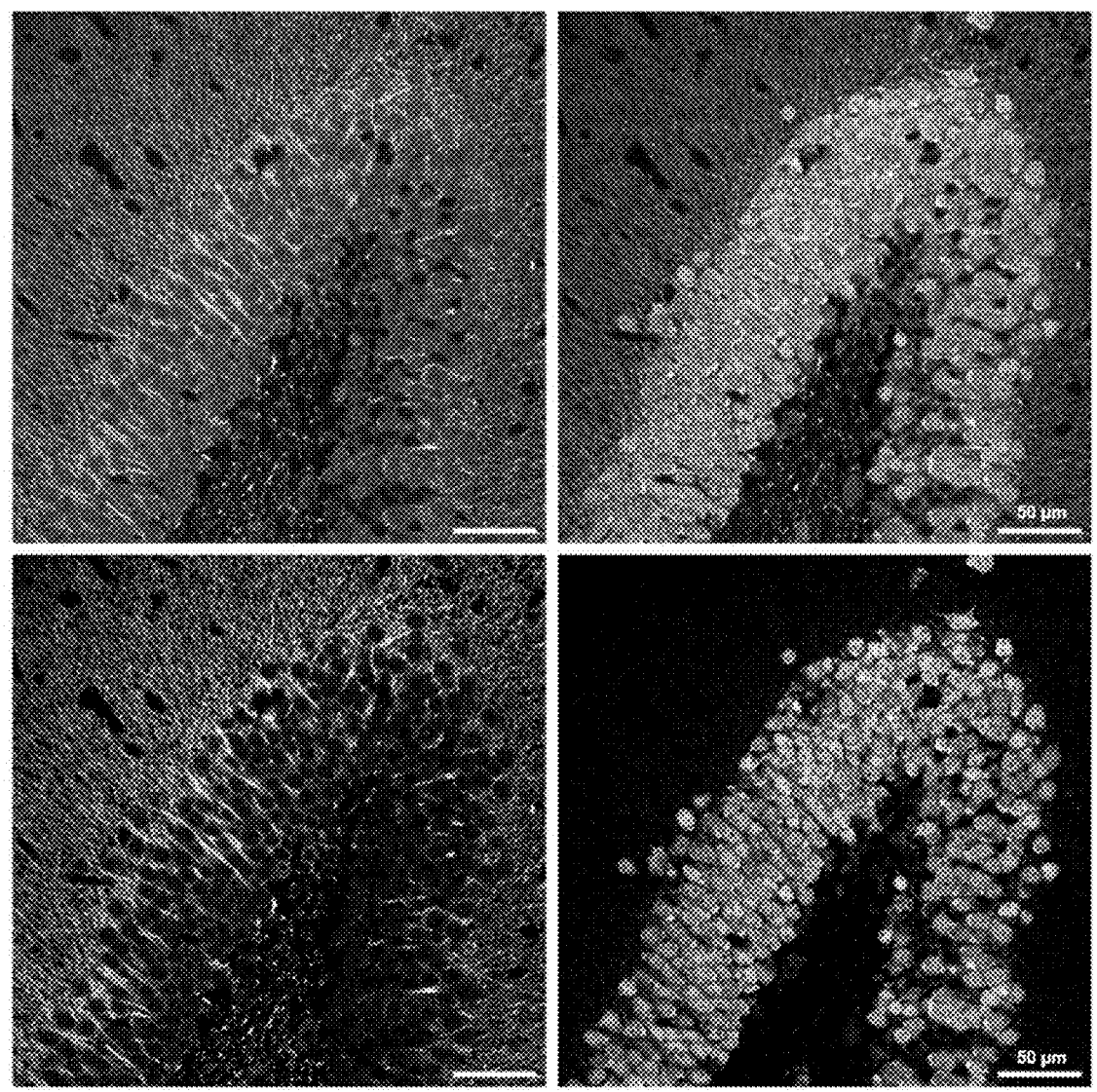

FIG. 5 is a flowchart specifically illustrating the step (step 420) of unmixing obtained images into images, each containing the signals of a single fluorophore from the images obtained in the embodiment of FIG. 4. FIGS. 6 and 7 are images for describing the step (step 420) of unmixing obtained images into images, each containing the signals of a single fluorophore from the images obtained in the embodiment of FIG. 4.

Referring to FIG. 5, in step 521, the electronic device 100 may selectively process the obtained images as low-resolution images, respectively. According to an embodiment, step 521 may be omitted. According to another embodiment, in step 521, the processor 150 may process the obtained images as low-resolution images having lower resolution than the obtained images, respectively, as in [Equation 4] below, if necessary. For example, the processor 150 may obtain a low-resolution image having k-times low resolution by averaging a value of neighbor k×k pixels within each obtained image. Accordingly, an operation speed in subsequent steps and resistance to noise can be increased. For another example, the processor 150 may omit step 521 by setting k=1 or may process the obtained images as low-resolution images, respectively, by using a different image sampling method.

$$v1 = \text{pixelBinning}(u1,k)$$

$$v2 = \text{pixelBinning}(u2,k) \quad \text{[Equation 4]}$$

wherein u1 and u2 may indicate the obtained images, respectively. v1 and v2 may indicate the low-resolution images, respectively. k may be defined as a factor applied in order to process the obtained images as the low-resolution images, respectively.

In step 523, the electronic device 100 may calculate variables from the obtained images or the low-resolution images by using a loss function. According to an embodiment, if step 521 is omitted, the processor 150 may calculate the variables from the obtained images. According to another embodiment, after step 521 is performed, the processor 150 may calculate the variables from the low-resolution images. In this case, as in [Equation 5] below, the loss function may be defined. Furthermore, the processor 150 may calculate the variables from the low-resolution images by using the loss function as in [Equation 6] below. In step 523, the processor 150 may quantize the obtained images or the low-resolution images before calculating the loss function, if necessary.

$$L_1(\alpha) = I(v1 - \alpha \times v2; v2) \quad \text{[Equation 5]}$$

$$L_2(\beta) = I(v1; v2 - \beta \times v1)$$

-continued $$\hat{\alpha} = \underset{\alpha}{\mathrm{argmin}}\, L_1(\alpha) = \underset{\alpha}{\mathrm{argmin}}\, I(v1 - \alpha \times v2; v2) \quad \text{[Equation 6]}$$

$$\hat{\beta} = \underset{\beta}{\mathrm{argmin}}\, L_2(\beta) = \underset{\beta}{\mathrm{argmin}}\, I(v1; v2 - \beta \times v1)$$

wherein $\hat{\alpha}$ and $\hat{\beta}$ may indicate the variables.

In step 525, the electronic device 100 may obtain two new images updated from the obtained images by applying the variables to the obtained images. In this case, the processor 150 may obtain the new images updated from the obtained images by applying the variables and an update ratio λ to the images as in [Equation 7] below. In this case, the update ratio λ may have a value between 0 and 1. In step 525, the obtained images may be high-resolution images.

$$u1 \leftarrow u1 - \lambda \vec{\alpha} u2$$

$$u2 \leftarrow u2 - \lambda \vec{\beta} u1 \quad \text{[Equation 7]}$$

In the above description, steps 523 and 525 have been described as being simultaneously performed on the obtained two images, but the present disclosure is not limited thereto. That is, steps 523 and 525 may be sequentially performed on the obtained images. According to an embodiment, if step 521 is omitted, steps 523 and 525 may be sequentially performed on the obtained images. According to another embodiment, steps 523 and 525 may be sequentially performed on the two variables $\hat{\alpha}$ and $\hat{\beta}$. Specifically, the two low-resolution images are obtained through step 521, one variable (e.g., $\hat{\alpha}$) is first calculated from the two low-resolution images, and a high-resolution image (e.g., u1) is updated by using the variable (e.g., $\hat{\alpha}$). Thereafter, a low-resolution image (e.g., v1) is obtained through the updated high-resolution image through step 521. Another variable (i.e., $\hat{\beta}$) is calculated by performing steps 523 and 525 on the obtained low-resolution image (e.g., v1) and another image (e.g., v2). A high-resolution image (e.g., u2) is updated by using the another variable (i.e., $\hat{\beta}$). After such a process is iteratively performed, the process may proceed to step 529.

In step 527, the electronic device 100 may determine whether to iterate the previous steps. According to an embodiment, the processor 150 may determine whether an iteration number in steps 521 to 525 has reached a predetermined number, that is, n times. If it is determined that the iteration number has not reached the predetermined number, the processor 150 may determine that the previous steps need to be iterated, may return to step 521, and may iteratively perform steps 521 to 525. If it is determined that the iteration number has reached the predetermined number, the processor 150 may determine that the previous steps do not need to be iterated, and may proceed to step 529. According to another embodiment, the processor 150 may determine whether mutual information shared by the images obtained in step 525 is equal to or smaller than a reference value. If it is determined that the mutual information shared by the obtained images is greater than the reference value, the processor 150 may determine that the previous steps need to be iterated, may return to step 521, and may iteratively perform steps 521 to 525. If it is determined that the mutual information shared by the obtained images is equal to or smaller than the reference value, the processor 150 may determine that the previous steps do not need to be iterated, and may proceed to step 529.

Accordingly, as steps 521 to 525 are iterated, the signals of fluorophores can be gradually unmixed as illustrated in FIG. 6. As a result, in step 529, the electronic device 100 may obtain the finally obtained images as images of fluorophores, respectively. In this case, the processor 150 obtains, as the final solution, the images having a minimized mutual information as in [Equation 8] below. Such images may indicate different fluorophores.

$$u1 \leftarrow \max(u1, 0)$$

$$u2 \leftarrow \max(u2, 0) \quad \text{[Equation 8]}$$

According to the first embodiments of the present disclosure, image unmixing performance can be improved. The PICASSO v1.0 technology extremely reduced the number of elements that need to be analogized for the signal unmixing scheme through a strategy for selecting specific fluorophores and detection spectral ranges, and then accurately analogized the number of elements by minimizing mutual information. In contrast, in the first embodiments of the present disclosure, a strategy for selecting specific fluorophores and fluorescent detection spectral ranges can be removed and relaxed through the iterative mutual-information quantity minimization strategy. Furthermore, in the first embodiments of the present disclosure, signals of two fluorophores can be successfully unmixed from two images in which the signals of the two fluorophores have different intensities through the analogy of a for each step and gradual signal unmixing. Accordingly, the present disclosure may be said to be new compared to the PICASSO v1.0.

Furthermore, as the results of the first embodiments of the present disclosure, as illustrated in FIG. 7, signals of two fluorophores having a difference of 20 nm or less between wavelengths in each of which an emission spectrum is a maximum, which is difficult to be achieved in the PICASSO v1.0, can be successfully unmixed. In an embodiment of the present disclosure, signals of two fluorophores having similar emission spectra can be successfully unmixed through the iterative mutual information minimization without a process of optimizing fluorescent detection spectral ranges. In the first embodiments of the present disclosure, the range of the first fluorescent detection spectral range can be widely set because the fluorescent detection spectral range selection strategy is excluded. Accordingly, the signal-to-noise ratio is increased, and thus unmixed images having high quality can be obtained compared to the PICASSO v1.0. Furthermore, in the first embodiments of the present disclosure, hardware requirements are reduced and an emission filter can be freely selected because a spectral range specified for a fluorophore does not need to be selected. Accordingly, the present disclosure may be said to be more inventive than the PICASSO v1.0.

Figure 8:
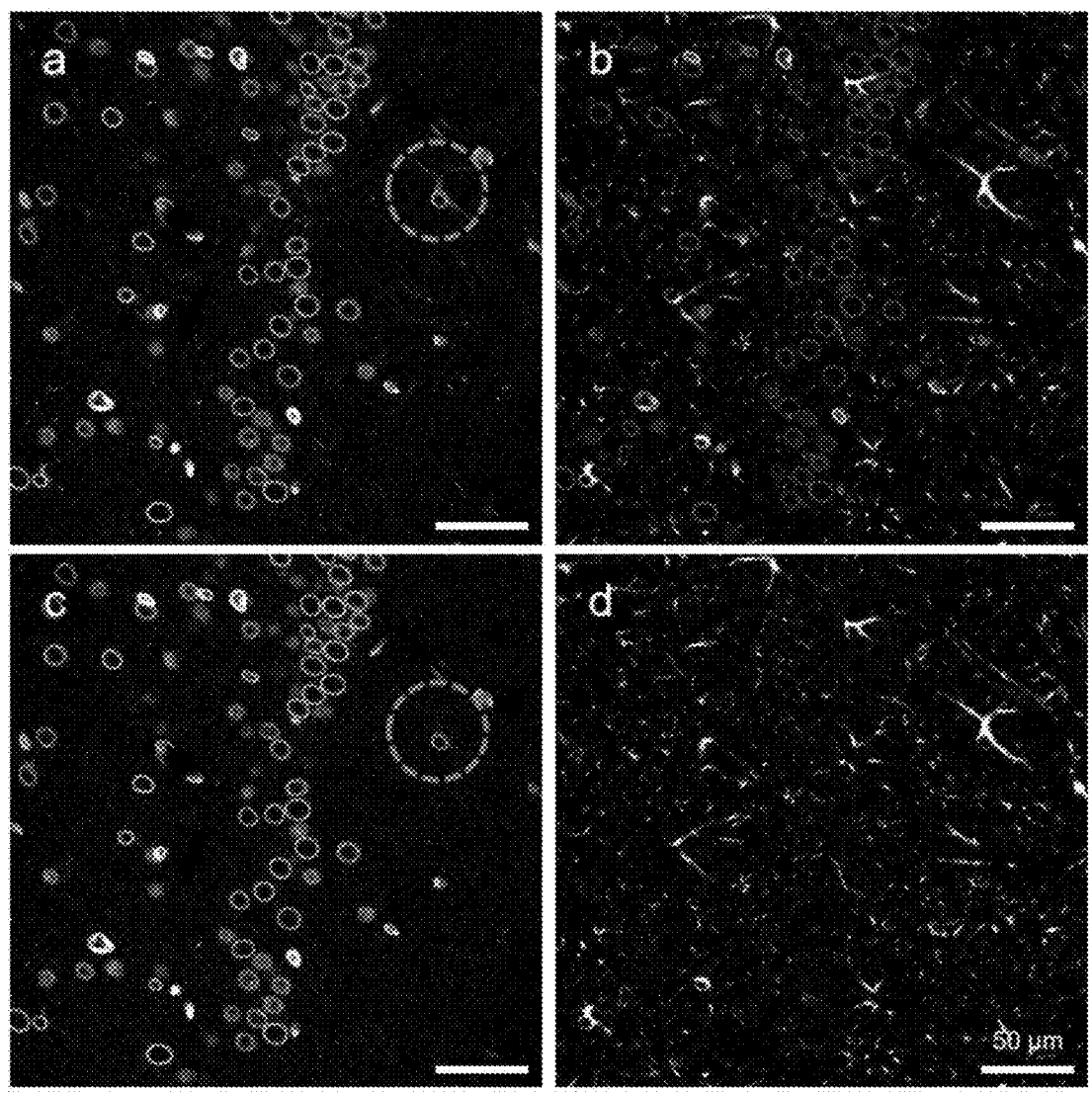
FIGS. 8, 9 and 10 are images for describing application ranges of the first embodiments of the present disclosure.
Figure 9:
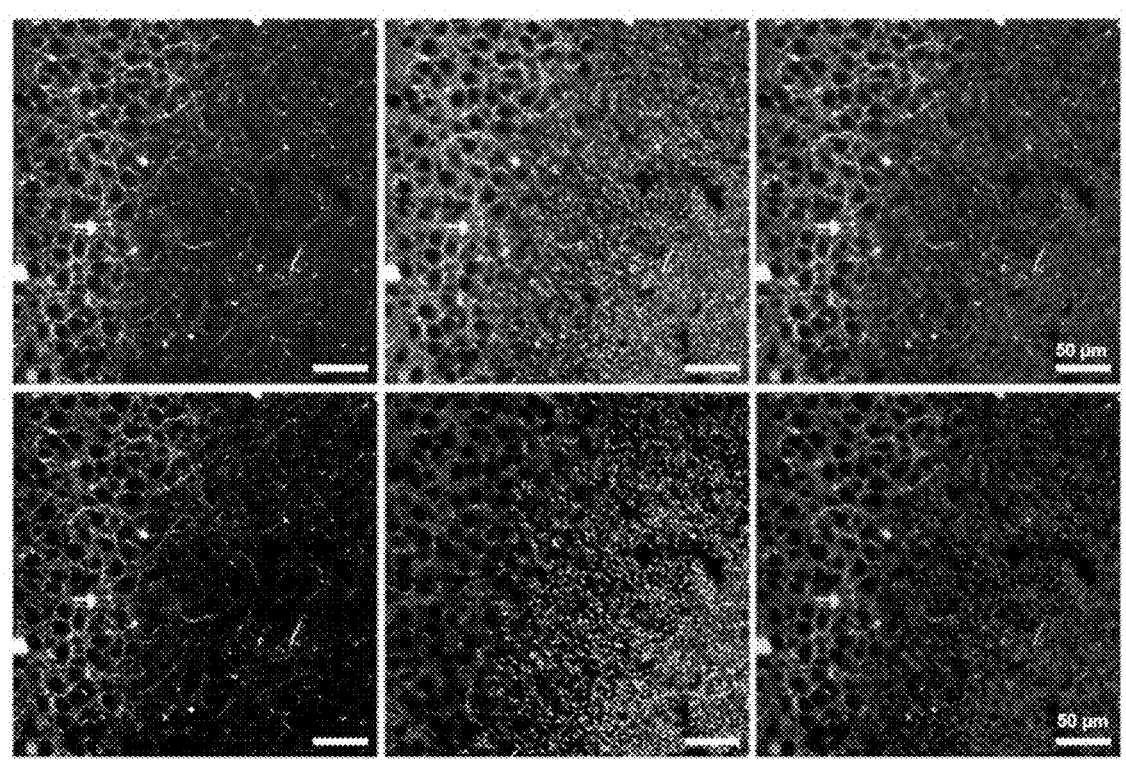
Figure 10:
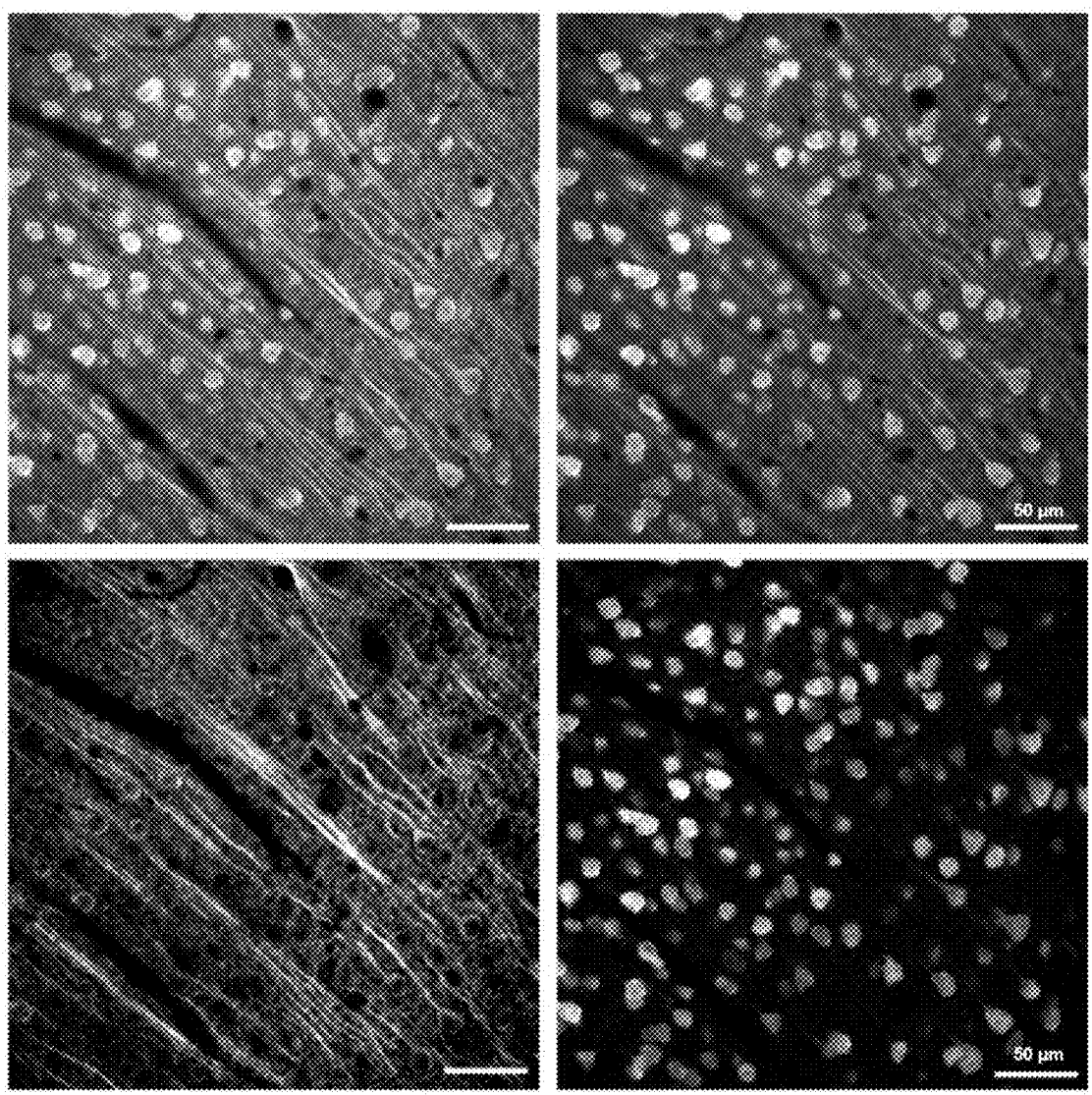

FIGS. 8, 9 and 10 are images for describing application ranges of the first embodiments of the present disclosure.

The first embodiments of the present disclosure may be applied to a wider range by removing and relaxing the precondition of the PICASSO v1.0 for signal unmixing.

For example, biomolecules to which the first embodiments of the present disclosure may be applied may include culture cells, animal tissue slices, clinic samples, etc. For another example, according to the first embodiments of the present disclosure, proteins marked with antibodies or mRNA marked with oligonucleotides can be simultaneously imaged. Furthermore, for another example, the first embodiments of the present disclosure are not limited to the type of samples or the type of biomolecules, and may be used to image all biomolecules which may be marked as fluorophores in all types of samples in which fluorophores may be used.

In order to monitor biomolecules within a biological tissue by using a fluorescence microscope, it is necessary to mark, with a fluorophore, a specific biomolecule within the biological tissue. In general, in order to monitor a protein, an antibody to which a fluorophore has been attached may be used. In order to monitor mRNA, an oligonucleotide to which a fluorophore has been attached may be used. In the present disclosure, an antibody is used to monitor protein, and oligonucleotide is used to monitor mRNA. However, the present disclosure may be applied to all marking methods using fluorophores or all marking molecules to which fluorophores or fluorescent proteins have been attached, as present disclosures are for distinguishing fluorophores.

The first embodiments of the present disclosure may be implemented by point-scanning confocal microscopy including a spectral detector as illustrated in FIG. 8, and may be implemented by spinning-disk confocal microscopy using emission filters as illustrated in FIG. 9. Furthermore, the first embodiments of the present disclosure may be implemented by the point-scanning confocal microscopy using emission filters, widefield microscopy using a emission filters, and all type of microscopy capable of selectively detecting only light of a specific spectral range, as illustrated in FIG. 10.

In the first embodiments of the present disclosure, a total of ten fluorophores can be simultaneously imaged using eight fluorophores whose emission spectra overlap and two large Stokes shift fluorophores, when four standard excitation lasers (405, 488, 560, 640 nm) are used. The first embodiments of the present disclosure are not limited to ten fluorophores, and may use more fluorophores. In the first embodiments of the present disclosure, signals of fluorescent proteins or fluorescent proteins and fluorophores whose emission spectra overlap can be unmixed. The first embodiments of the present disclosure remove the strategy for selecting fluorescent detection spectral ranges in the PICASSO v1.0 through the analogy of a and gradual signal unmixing by iteratively minimizing mutual information. Accordingly, the first embodiments of the present disclosure can be more universally used with a spectral detector capable of adjusting detection spectral ranges and a bandpass filter-based microscope. The first embodiments of the present disclosure may also be coupled with a multi-round staining method, and may be applied to all staining techniques using fluorophores. Furthermore, the first embodiments of the present disclosure may be applied to various imaging techniques, for example, tissue clearing techniques and super-resolution imaging techniques.

Figure 11:
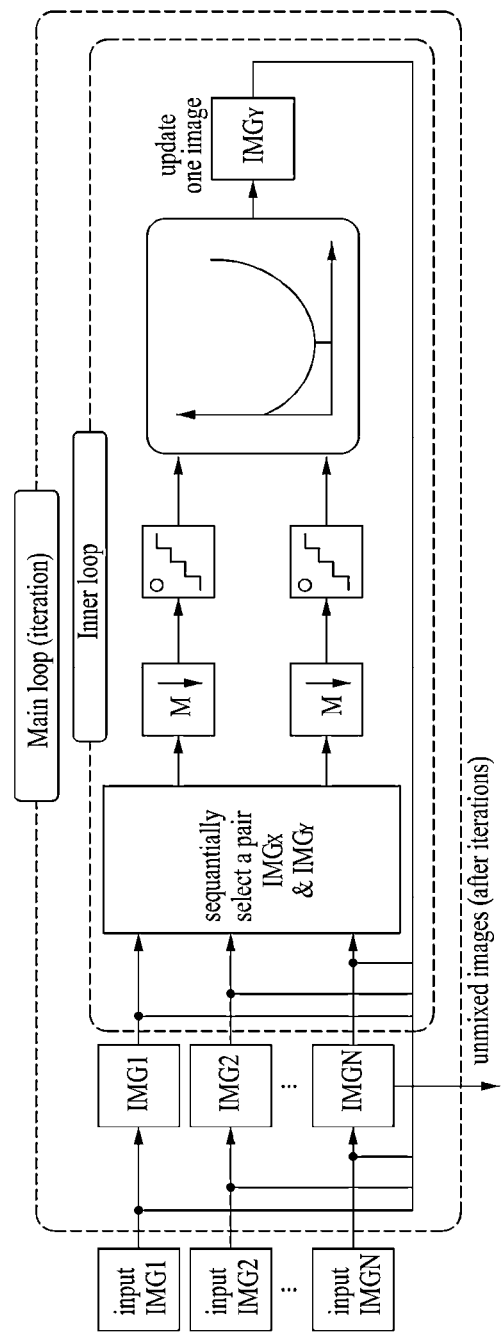
FIG. 11 is a schematic diagram for describing an operation principle of the electronic device according to the second embodiments of the present disclosure.

FIG. 11 is a schematic diagram for describing an operation principle of the electronic device 100 according to the second embodiments of the present disclosure.

Referring to FIG. 11, the processor 150 may obtain a plurality of images, for example, N images of a plurality of biomolecules marked with different fluorophores, respectively, for example, N fluorophores. In this case, the processor 150 may obtain the plurality of images in different detection spectral ranges, respectively. In each of the detection spectral ranges, emission spectra of at least two of the N fluorophores may overlap. In this case, N may be a number equal to or greater than 3. In other words, the processor 150 may obtain three or more images of three or more fluorophores. Furthermore, the processor 150 may unmix images of respective fluorophores from the obtained images while minimizing mutual information shared between images of each of pairs each consisting of two of the obtained images.

For example, when the N images are obtained in different detection spectral ranges by simultaneously exciting the N fluorophores by using one laser, images of the N fluorophores are linearly added to and appear in each of the images ($IMG_{ch,m} = \Sigma_k \alpha_{km} IMG_{F,k}$). In this case, a variable $\alpha_{km}$ on which images of several fluorophores are linearly added is different for each image. In selecting detection spectral ranges, the wavelength of the maximum emission spectrum of one fluorophore is designed to be included in each detection spectral range. This condition may be relaxed for the first and last spectral ranges, as the first detection spectral range may not need to include the wavelength of the maximum emission spectrum of the first fluorophore and the last detection spectral range may not need to include the wavelength of the maximum emission spectrum of the last fluorophore. If this condition on the detection spectral ranges is satisfied, when an operation of linearly subtracting other remaining (N−1) images from a corresponding image is performed, it is guaranteed that a component attributable to another molecule is preferentially removed compared to a fluorophore having a high point in a corresponding band. To accurately perform such removal of the signals of (N−1) fluorophores from each image, while satisfying the positivity conditions for all of $\alpha_{km}$, $IMG_{ch}$, and $IMG_{F,k}$, an iterative update algorithm having a dual loop structure is proposed as illustrated in FIG. 11.

The processor 150 selects two of N images. The two images are assumed to be X and Y (step i). Furthermore, the processor 150 finds a at which the mutual information I (X; Y−αX) of X and Y−αX can be minimized, and updates Y as in [Equation 9] below (step ii). In this case, the processor 150 calculates the mutual information. Y that is not downsampled and quantized is used for the update. Before calculating the mutual information, the processor 150 may downsample and quantize the obtained images, if necessary.

$$Y \leftarrow Y - \zeta\alpha X \quad \text{[Equation 9]}$$

wherein $\zeta$ indicates an update speed, and is a real number between 0 and 1.

In this case, the processor 150 selects two of N images according to all of possible permutations $_nP_2$, and iterates the above processes (steps i and ii) (step iii). In this case, the processor 150 iterates the above processes (step i, step ii and step iii) by a predetermined number p. In this case, the number p is determined as a positive integer that satisfies [Equation 10] based on target accuracy ε and the update speed $\zeta$.

$$(1-\zeta)^p \leq \varepsilon < \quad \text{[Equation 10]}$$

Figure 12A:
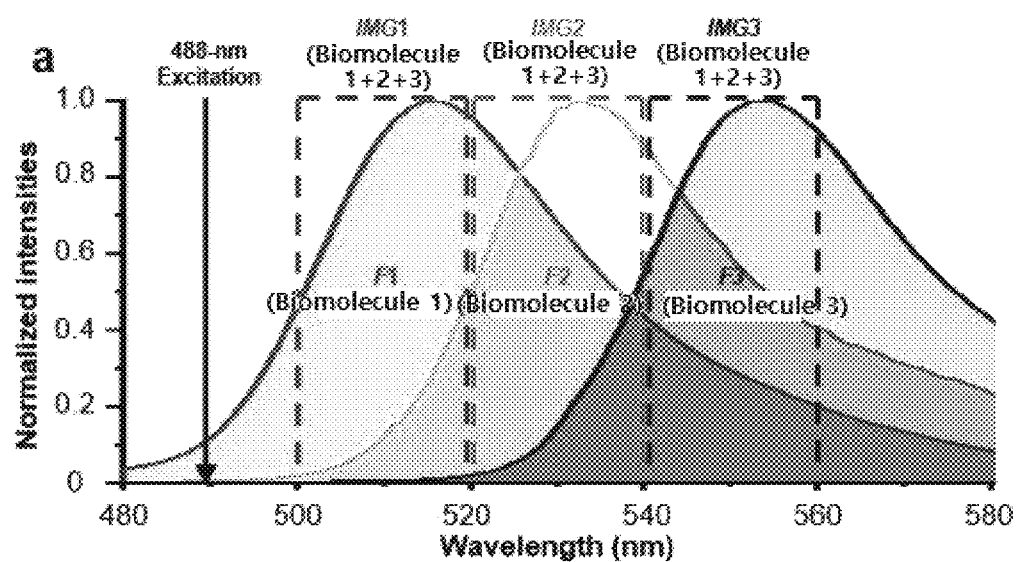
FIGS. 12A, 12B and 12C are exemplary diagrams for describing an example of an operation of the electronic device according to the second embodiments of the present disclosure.
Figure 12B:
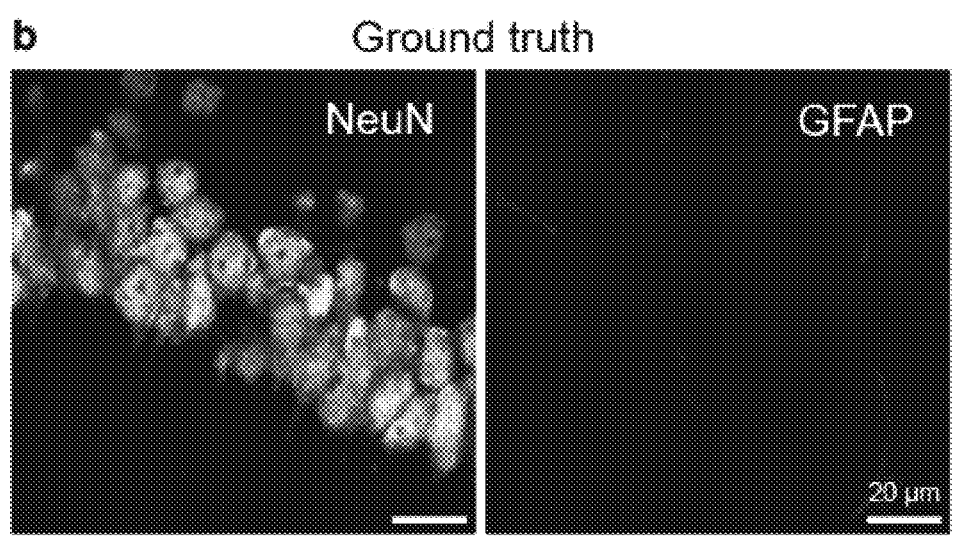
Figure 12C:
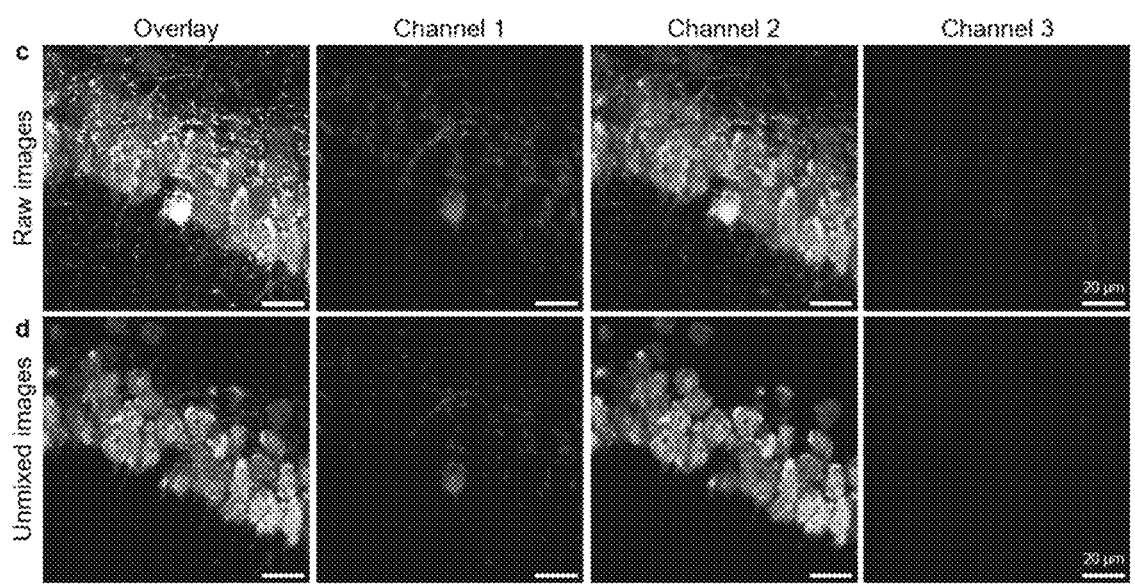

FIGS. 12A, 12B and 12C are exemplary diagrams for describing an example of an operation of the electronic device 100 according to the second embodiments of the present disclosure. FIG. 12A is a graph of an example of detection spectral ranges in the electronic device 100. Emission spectra of three fluorophores (CF488, ATTO514, and ATTO532) excited by a 488 nm laser overlap in each of the detection spectral ranges. FIG. 12B illustrates images of NeuN and GFAP, labeled with spectrally distinctive fluorophores for control groups. In FIG. 12C, (c) illustrates images before signal unmixing, which are obtained in three detection spectral ranges, and (d) illustrates, and images after signal unmixing. In (d) of FIG. 12C, from left to right, overlaid image, PV, NeuN, and GFAP are shown.

Referring to FIGS. 12A, 12B and 12C, in order to verify the validity of the iterative update algorithm, three proteins of NeuN, GFAP, and PV within a slice within the brain of a mouse were marked as three fluorophores whose emission spectra overlapped, respectively. Signals of the three fluorophores were unmixed using the iterative update algorithm. In order to check whether the image unmixed as described above actually included only a signal of one fluorophore, NeuN and GFAP were simultaneously marked with spectrally distinctive fluorophores, whose signals can be separately detected. In FIG. 12B, the two images are images of NeuN and GFAP marked with spectrally distinctive fluorophores as described above. Thereafter, signals of the three fluorophores whose emission spectra overlapped were obtained in the three detection spectral ranges indicated in FIG. 12A. As illustrated in (c) of FIG. 12C, all the three images obtained from the three detection spectral ranges included the three proteins NeuN, GFAP, and PV. The results of the three images unmixed by applying the iterative update algorithm of PICASSO v3.0 are illustrated in (d) of FIG. 12C. When comparing images of channels 2 and 3 in (d) of FIG. 12C with the two images in FIG. 12B, it may be seen that two images of the three images unmixed by the PICASSO v3.0 include only NeuN and GFAP, respectively. As described above, the three proteins could be clearly distinguished in the images in which signals have been unmixed through PICASSO v3.0. This evidenced that PICASSO v3.0 had a better multiplexed imaging ability compared to PICASSO v1.0 and v2.0. If PICASSO v3.0 is used, three or more fluorophores can be simultaneously used in one spectral range. If a large Stokes shift fluorophore is added, four or more fluorophores can be simultaneously used. Accordingly, in general, if PICASSO v3.0 is applied to five spectral ranges (i.e., 400-500 nm, 500-600 nm, 600-700 nm, and 700-800 nm) that are frequently used, a total of twenty or more fluorophores can be simultaneously used.

Figure 13:
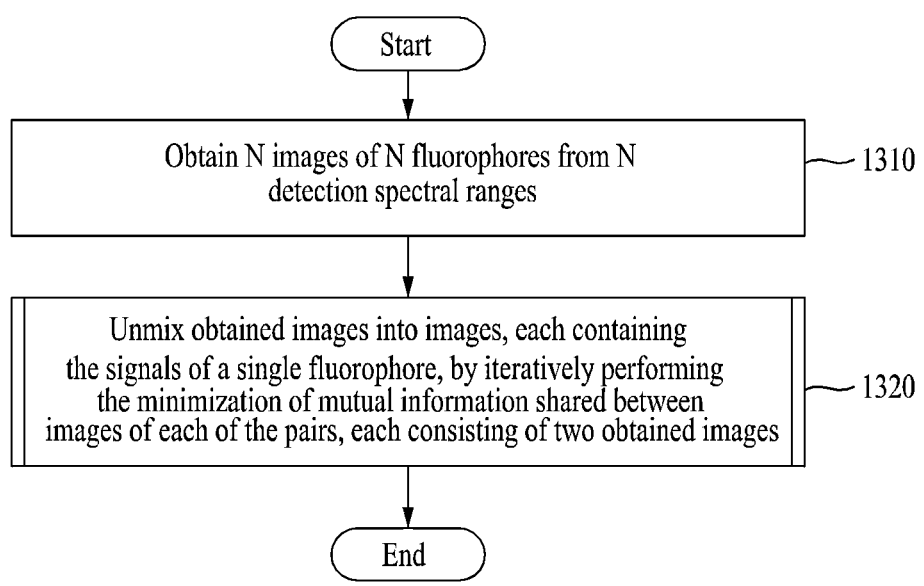
FIG. 13 is a flowchart of a multi-color unmixing method of the electronic device through the mutual information minimization according to the second embodiments of the present disclosure.

FIG. 13 is a flowchart of a multi-color unmixing method of the electronic device 100 through the minimization of mutual information according to the second embodiments of the present disclosure.

Referring to FIG. 13, in step 1310, the electronic device 100 may obtain a plurality of images, for example, N images of a plurality of biomolecules marked with different fluorophores, respective, for example, N fluorophores. In this case, the processor 150 may obtain the plurality of images in different detection spectral ranges, respectively. In each of the detection spectral ranges, emission spectra of at least two of the plurality of fluorophores may overlap. In this case, N may be a number equal to or greater than 3. In other words, the processor 130 may obtain three or more images of three or more fluorophores.

Next, in step 1320, the electronic device 100 may unmix obtained images into images, each containing the signals of a single fluorophore, while minimizing mutual information shared between images of each of pairs each consisting of two of the obtained images. To this end, the processor 150 may be configured to perform an operation of obtaining a plurality of new images updated from the obtained images by applying a variable α for minimizing the mutual information calculated with respect to images of each of the pairs. Accordingly, the obtained images may be images of respective fluorophores. In this case, the processor 150 may perform such an operation at a predetermined update speed ζ. In some embodiments, such an operation may be iterated by a predetermined number p. When the iteration of such an operation is completed, the processor 150 may finally obtain images of respective fluorophores. For example, such an operation may be iterated according to the iterative update algorithm having a dual loop structure, such as that illustrated in FIG. 2. This will be more specifically described with reference to FIG. 14.

Figure 14:
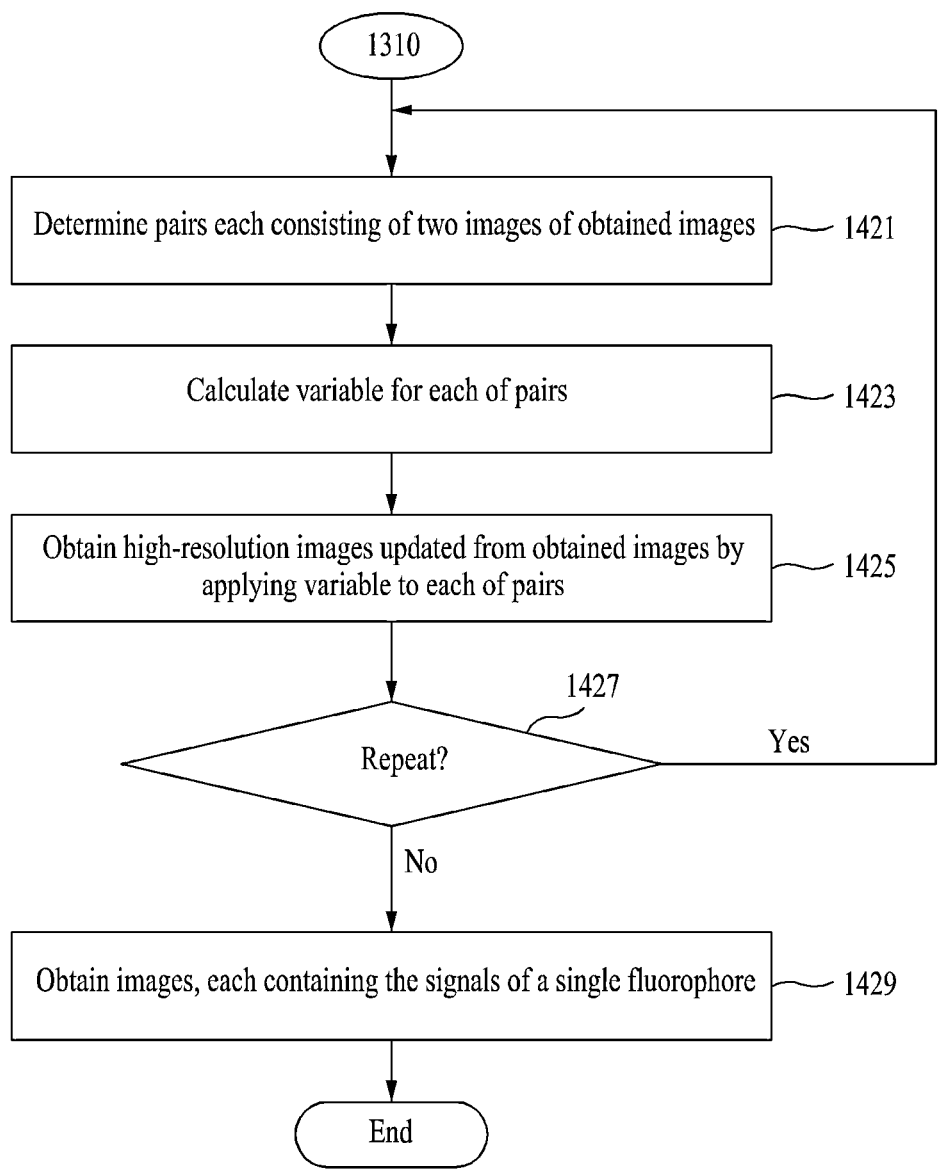
FIG. 14 is a flowchart specifically illustrating the step of unmixing obtained images into images, each containing the signals of a single fluorophore from images obtained in the embodiment of FIG. 13.

FIG. 14 is a flowchart specifically illustrating the step (step 1320) of unmixing obtained images into images, each containing the signals of a single fluorophore from the images obtained in the embodiment of FIG. 13.

Referring to FIG. 14 along with FIG. 11, in step 1421, the electronic device 100 may determine pairs each consisting of two images X and Y among the obtained N images. In this case, the processor 150 may determine the pairs among the obtained N images according to all of possible permutations $_nP_2$.

In step 1423, the electronic device 100 may calculate a variable a for each of the pairs. In this case, the processor 150 may calculate the mutual information for each of the pairs based on the images X and Y of each of the pairs. In this case, the mutual information may be defined as in [Equation 11] below. Accordingly, the processor 150 finds a at which the mutual information $I(X; Y-\alpha X)$ of X and $Y-\alpha X$ can be minimized. Before calculating the mutual information, the processor 150 may downsample and quantize the obtained images, if necessary.

$$I(X; Y-\alpha X) \qquad \text{[Equation 11]}$$

In step 1425, the electronic device 100 may obtain new images X and Y updated from the obtained images X and Y by applying the variable α to each of the pairs. In this case, the processor 150 may update one (Y) of the images X and Y of each of the pairs by applying an update speed to one (Y) of the images X and Y of each of the pairs along with the variable a as in [Equation 12] below. In this case, the processor 150 may update obtained images Y, that is, high-resolution images (Y) that have not been downsampled and quantized.

$$Y \leftarrow Y - \zeta \alpha X \qquad \text{[Equation 12]}$$

In the above description, steps 1423 and 1425 have been illustrated as being performed on each of the pairs determined in step 1421, but the present disclosure is not limited thereto. That is, the results of a new image updated by performing steps 1423 and 1425 on one pair may be used to perform steps 1423 and 1425 on the other pair. For example, assuming that three obtained images, that is, IMG1, IMG2, and IMG3 are present, in step 1421, six pairs, that is, (IMG1 IMG2) (IMG2, IMG1), (IMG1, IMG3), (IMG2, IMG3), and (IMG3, IMG2) may be determined. In such a case, first, IMG1 may be updated by performing steps 1423 and 1425 on (IMG1, IMG2), thereby obtaining IMG1'. Accordingly, (IMG2, (IMG1, IMG3), and (IMG3, IMG1) may be updated into (IMG2, IMG1'), (IMG1', IMG3), and (IMG3, IMG1'). Through such a method, steps 1423 and 1425 may be simultaneously performed on all the pairs or steps 1423 and 1425 may be sequentially performed on all the pairs. Accordingly, the results of steps 1423 and 1425 performed on one of the pairs may be used to perform steps 1423 and 1425 on the other of the pairs. Furthermore, after the sequential execution, the process may proceed to step 1427.

In step 1427, the electronic device 100 may determine whether to iterate the previous steps. In this case, the processor 150 may determine whether an iteration number in steps 1421 to 1425 has reached a predetermined number p. In this case, if it is determined that the iteration number has not reached the predetermined number p, the processor 150 may determine that the previous steps need to be iterated, may return to step 1421, and may iteratively perform steps 1421 to 1425. If it is determined that the iteration number has reached the predetermined number p, the processor 150 may determine that the previous steps do not need to be iterated, and may proceed to step 1429. In this case, the number p may be determined as a positive integer that is satisfied based on target accuracy c and an update speed as in [Equation 13] below.

$$(1-\zeta)^{p} < \varepsilon \qquad \text{[Equation 13]}$$

In step 1429, the electronic device 100 may obtain the finally obtained images as images, each containing the signals of a single fluorophore.

According to the present disclosure, image unmixing performance can be improved. In this case, in the present disclosure, signals of three or more fluorophores whose emission spectra overlap in one spectral range can be unmixed. Specifically, in the present disclosure, images of spectrally overlapping fluorophores can be unmixed using only images obtained from detection spectral ranges having the same number as the number of fluorophores without measuring the emission spectrum of each of the fluorophores.

The aforementioned embodiments of the present disclosure are not implemented by only a device and method, but may be implemented through a program for realizing a function corresponding to an element according to an embodiment of the present disclosure or a recording medium on which the program has been recorded.

The embodiments of the present disclosure have been described in detail, but the scope of rights of the present disclosure is not limited thereto. A variety of modifications and changes using the basic concept of the present disclosure defined in the appended claims are also included in the scope of rights of the present disclosure.

The embodiments of the invention in which an exclusive property or privilege is claimed are defined as follows:

1. A method of an electronic device, comprising:
   obtaining at least two images of at least two fluorophores marking different biomolecules, respectively; and
   unmixing the at least two images into unmixed images, each of the unmixed images containing signals of a single fluorophore, while iteratively minimizing mutual information shared by the at least two images in the unmixed images,
   wherein the obtaining of the at least two images of at least two fluorophores comprises obtaining two images of two fluorophores, and
   wherein the unmixing of the two images comprises obtaining two unmixed images updated from the two images by applying variables for minimizing the mutual information calculated with respect to the two images, the iteration resulting in each of the unmixed images containing signals of a single fluorophore,
   wherein the obtaining of the two updated unmixed images from the two images comprises processing the two images as low-resolution images having lower resolution than the two images, respectively, as in [Equation i] below;

$v1 = \text{pixelBinning}(u1, k)$ $v2 = \text{pixelBinning}(u2, k)$ [Equation i]

wherein the u1 and the u2 indicate the two images, respectively, the v1 and the v2 indicate the low-resolution images, respectively, and the k indicates a factor applied in order to process the two images as the low-resolution images, respectively, calculating variables from the low-resolution images as in [Equation iii] below by using a loss function defined as in [Equation ii] below; and $$L_1(\alpha) = I(v1 - (\alpha \times v2); v2), \qquad \text{[Equation ii]}$$

$$L_2(\beta) = I(v1; v2 - \beta \times v1)$$

$$\hat{\beta} = \underset{\beta}{\operatorname{argmin}} L_2(\beta) = \underset{\beta}{\operatorname{argmin}} I(v1; v2 - \beta \times v1) \qquad \text{[Equation iii]}$$

wherein the $\hat{\alpha}$ and $\hat{\beta}$ the indicate the variables, respectively, obtaining the two updated unmixed images from the two images by applying the variables and an update ratio λ to the two images as in [Equation iv] below;

$u1 \leftarrow u1 - \lambda \hat{\alpha} u2$ $u2 \leftarrow u2 - \lambda \hat{\beta} u1$ [Equation iv]

2. A method of an electronic device, comprising:
   obtaining at least two images of at least two fluorophores marking different biomolecules, respectively; and
   unmixing the at least two images into unmixed images, each of the unmixed images containing signals of a single fluorophore, while iteratively minimizing mutual information shared by the at least two images in the unmixed images,
   wherein the obtaining of at least two images of at least two fluorophores comprises obtaining three or more images of three or more fluorophores, and
   wherein the unmixing of the at least two images comprises unmixing the three or more images into the unmixed images, each of the unmixed images containing signals of a single fluorophore, while minimizing the mutual information shared by each pair of the three or more images, each pair consisting of two of the three of more images.

3. The method of claim 2, wherein the unmixing of the three or more images comprises obtaining a plurality of unmixed images updated from the three or more images by applying variables for minimizing the mutual information calculated with respect to the each pair of the three or more images.

4. The method of claim 3, wherein the obtaining of a plurality of unmixed images updated from the three or more images is configured to obtain the plurality of unmixed images updated from the three or more images at a predetermined update speed and is iterated by a predetermined number, and
   when the iteration of the obtaining of the unmixed images updated from the three or more images is completed, each of the unmixed images containing signals of a single fluorophore.

5. The method of claim 4, wherein the number is determined based on target accuracy and the update speed as in [Equation v] below:

$$(1-\zeta)^{p} < \varepsilon \qquad \text{[Equation v]}$$

wherein the p indicates the number, the c indicates the target accuracy, the indicates the update speed, and the update speed is a real number between 0 and 1.

6. The method of claim 3, wherein the obtaining of a plurality of unmixed images updated from the three or more images comprises:
   calculating the variables from each pair of the three or more images; and updating one of the pairs of the three or more images by applying the variables to the one of the pairs of the three or more images.

7. An electronic device comprising:
a memory; and
a processor connected to the memory and configured to execute at least one instruction stored in the memory, wherein the processor is configured to:
obtain at least two images of at least two fluorophores marking different biomolecules, respectively, and
unmix the at least two images into unmixed images, each of the unmixed images containing signals of a single fluorophore, while iteratively minimizing mutual information shared by the at least two images in the unmixed images,
obtain three or more images of three or more fluorophores, and
unmix the three or more images into the unmixed images, each of the unmixed images containing the signals of a single fluorophore, while minimizing the mutual information shared by each pair of the three or more images.

8. The electronic device of claim 7, wherein the processor is configured to perform an operation of obtaining a plurality of unmixed images updated from the three or more images by applying a variable for minimizing mutual information calculated with respect to each pair of the three or more images.

9. The electronic device of claim 8, wherein the processor is configured to:
perform the operation at a predetermined update speed, and
iterate the operation by a predetermined number,
when the iteration of the operation is completed, images, each containing the signals of a single fluorophore, are obtained.

10. The electronic device of claim 9, wherein the number is determined based on target accuracy and the update speed for each of the images of the respective fluorophores as in [Equation x] below:

$$(1-\zeta)^p < \varepsilon \qquad \text{[Equation x]}$$

wherein the p indicates the number, the c indicates the target accuracy, the $\zeta$ indicates the update speed, and the update speed is a real number between 0 and 1.

11. The electronic device of claim 8, wherein the processor is configured to:
calculate the variables from each pair of the three or more images, and
update one of the pairs of the three or more images by applying the variables to the one of the pairs of the three or more images.

* * * * *